United States Patent [19]

Hanaoka

[11] Patent Number: 5,339,304
[45] Date of Patent: Aug. 16, 1994

[54] OPTICAL DISC HAVING TWO-STEP PIT STRUCTURE AND PICKUP APPARATUS

[75] Inventor: Minoru Hanaoka, Saitama, Japan

[73] Assignee: Pioneer Electronic Corporation, Tokyo, Japan

[21] Appl. No.: 44,117

[22] Filed: Apr. 8, 1993

Related U.S. Application Data

[63] Continuation of Ser. No. 787,583, Nov. 4, 1991, abandoned.

[30] Foreign Application Priority Data

Jun. 6, 1991 [JP] Japan ................. 3-135101

[51] Int. Cl.⁵ ............................................. G11B 7/00
[52] U.S. Cl. ....................... 369/109; 369/275.1; 369/275.4
[58] Field of Search ............... 369/275.1, 275.4, 109, 369/275.3

[56] References Cited

U.S. PATENT DOCUMENTS

| | | | |
|---|---|---|---|
| 4,161,752 | 7/1979 | Basilico | 369/109 |
| 4,455,632 | 6/1984 | Braat . | |
| 4,963,464 | 10/1990 | Setani | 430/495 |
| 5,016,240 | 5/1991 | Strandjord et al. | 369/288 |
| 5,144,552 | 9/1992 | Abe | 369/275.1 |
| 5,168,490 | 12/1992 | Braat | 369/109 |
| 5,204,852 | 4/1993 | Nakagawa et al. | 369/275.1 |

FOREIGN PATENT DOCUMENTS

| | | |
|---|---|---|
| 0099085 | 1/1984 | European Pat. Off. . |
| 2396378 | 1/1979 | France . |
| 3080443 | 6/1991 | Japan . |

OTHER PUBLICATIONS

European Search Report, dated Jan. 11, 1993.

*Primary Examiner*—Paul M. Dzierzynski
*Assistant Examiner*—Kim-Kwok Chu
*Attorney, Agent, or Firm*—Sughrue, Mion, Zinn, Macpeak & Seas

[57] ABSTRACT

An optical disc has a two-step pit structure in which first pits and second pits whose depth is a half of that of the first pits are arranged in superposition in the same track direction. A first laser diode emits first laser light having a first wavelength which is four times the depth of the first pits, and a second laser diode emits second laser light having a second wavelength which is four times the depth of the second pits. An optical system introduces the first and second laser light onto a recording surface of the optical disc, and also introduces reflected light to a detector. A selecting drive mechanism may be provided to select one of the first and second laser diodes as a light source for actually emitting light to be introduced onto the recording surface.

10 Claims, 3 Drawing Sheets

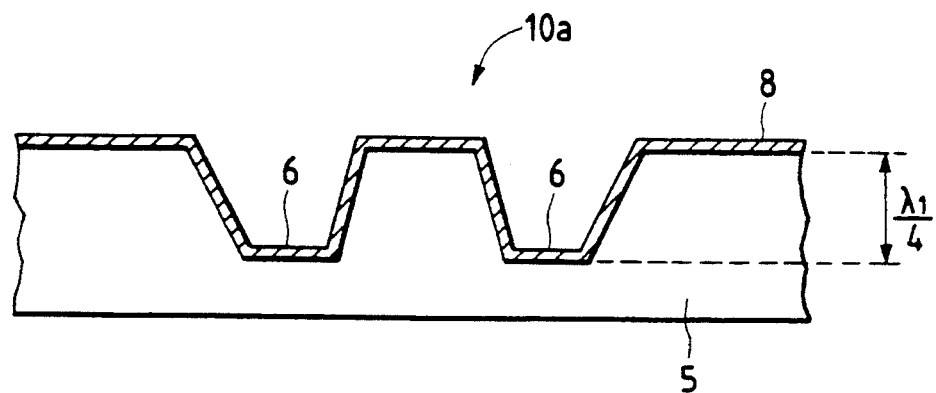
FIG. 5
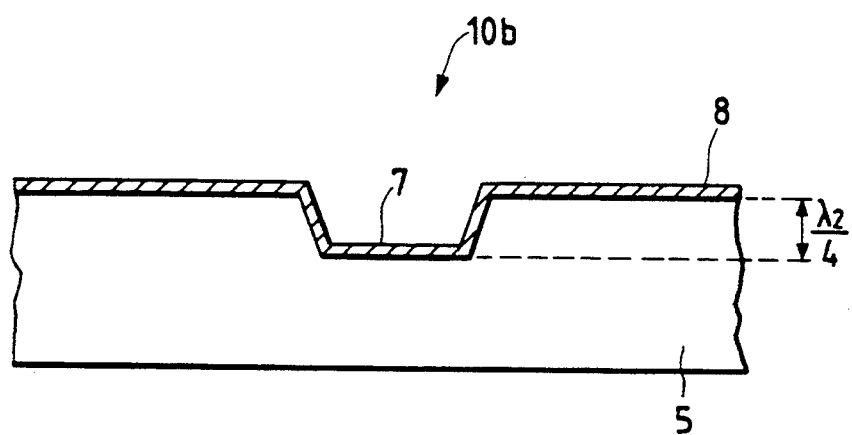
FIG. 6
FIG. 7
PRIOR ART
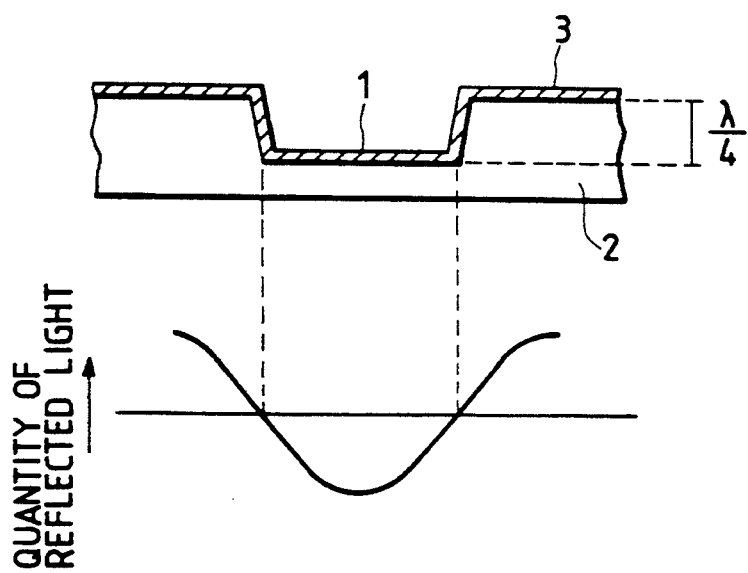

OPTICAL DISC HAVING TWO-STEP PIT STRUCTURE AND PICKUP APPARATUS

This is a continuation of application Ser. No. 07/787,583 filed Nov. 4, 1991, now abandoned.

BACKGROUND OF THE INVENTION

The present invention relates to an optical disc and a pickup apparatus for reading out information recorded on that optical disc.

As is well known in the art, a recording surface of an optical disc has a series of pits which are arranged in the track direction, and which have respective lengths in accordance with recorded information. A signal representing the pit lengths is obtained from the quantity of light reflected from the recording surface when it is irradiated with coherent light (i.e., single wavelength light such as laser light).

This is explained in more detail with reference to FIG. 7. As shown in FIG. 7, a pit 1 is formed on a plastic disc 2 with a depth of a quarter of a wavelength $\lambda$ of the laser light. The recording surface, which is an uneven surface containing the pits 1, is covered with a reflecting film 3. Further, although not shown in the figure, the reflecting film 3 is covered with a transparent protective film. When the laser light is incident on a non-pit portion of the recording surface, most of the incident light is reflected by the recording surface as shown in FIG. 7, producing a large quantity of reflected light. On the other hand, when the laser light is incident on a pit portion, only a small quantity of reflected light is produced because of an interference effect. The reflected light quantity is converted by a pickup apparatus into an electrical signal as a readout signal. Thus, the information, which is represented by the lengths of the pits 1, is read out.

While, in recent years, it is desired to increase the information recording density of an optical disc, the current recording density level is not enough which is obtained by simply forming pits with a depth of a quarter of a wavelength $\lambda$ of the coherent light.

SUMMARY OF THE INVENTION

An object of the present invention is to provide an optical disc having a large information recording density and a pickup apparatus for reading out information recorded on that optical disc.

According to the invention, an optical disc comprises:
a first pits arranged in a track direction and having a first depth; and
a second pits arranged in the track direction and having a second depth which is a half of the first depth.

Further, a pickup apparatus for reading out information recorded on an optical disc in the form of first pits arranged in a tracking direction and having a first depth and second pits arranged in the track direction and having a second depth which is a half of the first depth, comprises:
means for emitting a first coherent light beam having a first wavelength which is four times the depth of the first pits;
means for emitting a second coherent light beam having a second wavelength which is four times the depth of the second pits;
means for introducing the first and second coherent light beams onto a recording surface of the optical disc, and for introducing at least respective parts of the first and second light beams reflected by the recording surface; and
means for detecting quantities of the at least respective parts of the reflected first and second light beams, which have been introduced by the introducing means.

BRIEF DESCRIPTION OF THE DRAWINGS

FIG. 5 is a sectional view showing an equivalent pit structure in the case where the disc of FIG. 1 is irradiated with laser light of $\lambda_1$;

FIG. 6 is a sectional view showing an equivalent pit structure in the case where the disc of FIG. 1 is irradiated with laser light of $\lambda 2$; and FIG. 7 shows a pit structure of a conventional optical disc and a distribution of a quantity of light reflected therefrom.

DESCRIPTION OF THE PREFERRED EMBODIMENT

An embodiment of the invention will be described hereinafter with reference to the accompanying drawings.

Figure 1:
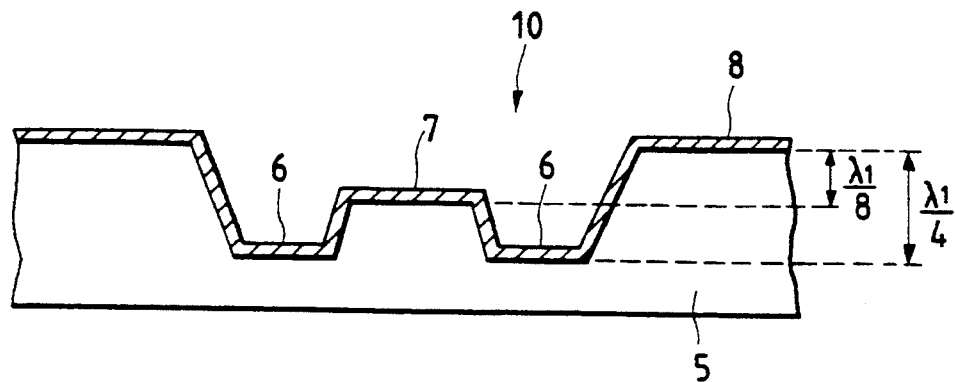
FIG. 1 is a sectional view showing pits of an optical disc according to the present invention.

FIG. 1 is a sectional view of pits formed on an optical disc 10 according to the invention. The disc 10 has a two-step structure of pits in which first-step pits 6 and shallower second-step pits 7 are formed on a plastic disc 5. The first-step pits 6 have a depth of $\lambda_1/4$, and bear first information to be reproduced by laser light having wavelength $\lambda_1$. The second-step pits 7 have a depth of $\lambda_1/8$, and bear second information to be reproduced by laser light having wavelength $\lambda_1/2$. The uneven recording surface containing first-step pits 6 and second-step pits 7 is covered with a reflecting film 8, which is further covered with a transparent protective film (not shown).

Next, a pickup apparatus for the above optical disc will be described.

Figure 2:
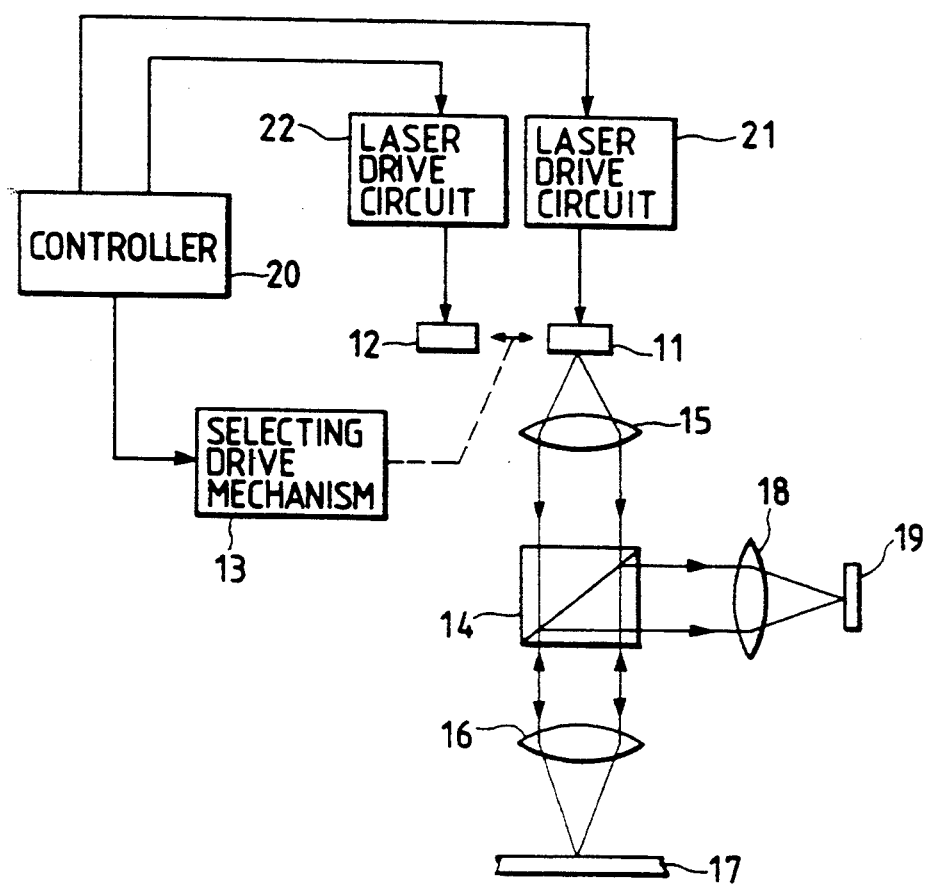
FIG. 2 is a block diagram showing the construction of a pickup apparatus according to the invention.

As shown in FIG. 2, a pickup apparatus includes two laser diodes 11 and 12 which, being driven by laser drive circuits 21 and 22, emit laser light beams of wavelengths $\lambda_1$ and $\lambda 2$, respectively. A selecting drive mechanism 13 mechanically drives the laser diodes 11, 12 so that one of the laser diodes 11, 12 is placed at a predetermined position (the position of laser diode 11 in FIG. 2) in an optical system.

Laser light emitted from the selected one of the laser diodes 11, 12 is collimated by a collimator lens 15, passed through a beam splitter 14, and focused by an objective lens 16 onto the recording surface of a disc 17. Reflected light from the disc 17 is passed through the objective lens 16, and split by the beam splitter 14 into two parts. One part of the reflected light is passed through a detection lens 18, and made incident on a detector 19.

The selecting drive mechanism operates based on instructions provided from a controller 20. One of the laser drive circuits 21, 22 is selectively activated also based on instructions from the controller 20. The controller 20 is, for instance, a microcomputer, and provides other various instructions, such as a "play" instruction, in accordance with the state of an operating means (not shown).

When the pickup apparatus receives the "play" instruction from the operating means with the laser diode 11 being located in the predetermined position in the optical system, the pickup apparatus is placed into a playing state and the laser drive circuit 21 drives the laser diode 11. Laser light having the wavelength $\lambda_1$ is emitted from the laser diode 11, collimated by the collimator lens 15, passed through the beam splitter 14, and focused by the objective lens 16 onto the recording surface of the disc 17. When the light is incident on a non-pit portion of the recording surface, most of it is reflected by the recording surface and reaches the detector 19 via the objective lens 16, beam splitter 14 and detection lens 18. A signal output from the detector 19 will have a value larger than a threshold value.

Figure 3A:
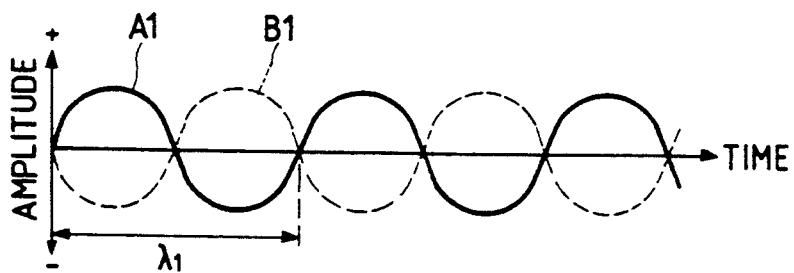
FIGS. 3(a) and 3(b) are waveform diagrams showing a relationship between an incident wave of $\lambda_1$ which is incident on a first-step pit and a corresponding reflection wave.
Figure 3B:
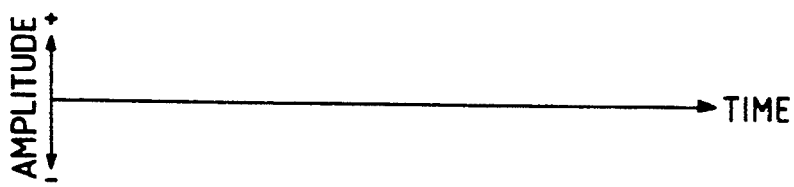

In the case of the laser light of $\lambda_1$ incident on the first-step pit 6, a reflected wave B1 (dashed line in FIG. 3(a)) is delayed from an incident wave A1 (solid line in FIG. 3(a)) by two times the depth of the first-step pit 6, i.e., $2(\lambda_1/4)=\lambda_1/2$. Therefore, as shown in FIG. 3(a), the waves A1 and B1 have opposite phases and so cancel out each other. As a result, substantially no wave occurs as a combination of the waves A1 and B1 as shown in FIG. 3(b), and a very small quantity of light reaches the detector 19. A signal output from the detector 19 is smaller than the threshold value.

Figure 4A:
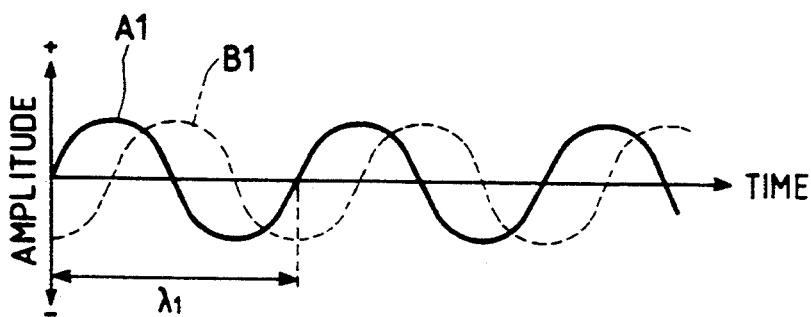
FIGS. 4(a) and 4(b) are waveform diagrams showing a relationship between the incident wave of $\lambda_1$ which is incident on a second-step pit and a corresponding reflection wave.
Figure 4B:
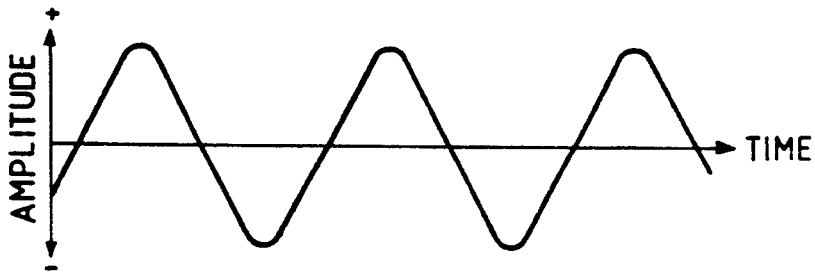

In the case of the laser light of $\lambda_1$ incident on the second-step pit 7, a reflected wave B1 (dashed line in FIG. 4(a)) is delayed from an incident wave A1 (solid line in FIG. 4(a)) by two times the depth of the second-step pit 7, i.e., $2(\lambda_1/8)=\lambda_1/4$. Therefore, the combined wave assumes a waveform as shown in FIG. 4 (b), and the two waves A1 and B1 do not cancel out each other. The detector 19 outputs a signal which is larger than the threshold value.

Therefore, it is concluded that when the laser light of $\lambda_1$ is emitted from the laser diode 11, the pits of the optical disc 10 of FIG. 1 are considered equivalent to pits of an optical disc 10a shown in FIG. 5 on which only the first-step pits 6 are formed. The first information can be obtained from the output signal of the detector 19.

Next, the other case will be discussed in which the laser diode 12 is moved to the predetermined position in the optical system by the selecting drive mechanism 13, and the pickup apparatus is placed in the playing state in response to the "play" instruction from the operating means. In this case, the laser drive circuit 22 drives the laser diode 12. The laser light having the wavelength $\lambda_2$ is emitted from the laser diode 12, collimated by the collimator 15, passed through the beam splitter 14, and focused onto the recording surface of the disc 17 by the objective lens 16. When the light is incident on a non-pit portion of the recording surface, most of it is reflected from the recording surface and reaches the detector 19 via the objective lens 16, beam splitter 14 and detection lens 18. A signal output from the detector 19 will have a value larger than a threshold value.

In the case of the laser light of $\lambda_2$ incident on the first-step pit 6, a reflected wave B2 is delayed from an incident wave A2 by two times the depth of the first-step pit 6, i.e., $2(\lambda_1/4)=2(\lambda_2/2)=\lambda_2$. Therefore, the waves A2 and B2 have the same phase. As a result, a very large quantity of light reaches the detector 19, so that a signal output from the detector 19 is larger than the threshold value.

In the case of the laser light of $\lambda_2$ incident on the second-step pit 7, a reflected wave B2 is delayed from an incident wave A2 by two times the depth of the second-step pit 7, i.e., $2(\lambda_1/8)=2(\lambda_2/4)=\lambda_2/2$. Therefore, the two waves A2 and B2 have opposite phases and so cancel out each other, as in the case of the light of $\lambda_1$ shown in FIG. 3(a). As a result, a vary small quantity of light reaches the detector 19, and a signal output from the detector 19 is smaller than the threshold value.

Therefore, it is concluded that when the laser light of $\lambda_2$ is emitted from the laser diode 12, the pits of the optical disc 10 of FIG. 1 are considered equivalent to pits of an optical disc 10b shown in FIG. 6 on which only the second-step pits 7 are formed. The second information can be obtained from the output signal of the detector 19.

Although, in the above embodiment, the laser light of $\lambda_1$ or $\lambda_2$ is selectively emitted, the invention is not limited to this embodiment. Both the laser beams $\lambda_1$ and $\lambda_2$ may be simultaneously emitted, and corresponding light components reflected by the recording surface may be separated by an appropriate filter and detected by individual detectors to simultaneously read out the first and second information.

According to the present invention, with respect to the first coherent light having the wavelength four times the depth of the first-step pits which bear the first information recorded on the optical disc, a quantity of light reflected from the first-step pits is small, and a quantity of light reflected from the second-step pits having the depth of a half of that of the first-step pits is large as in the case of non-pit portions. This makes it possible to pick up the first information. On the other hand, with respect to the second coherent light having the wavelength four times the depth of the second-step pits which bear the second information, a quantity of light reflected from the first-step pits is large as in the case of non-pit portions, and a quantity of light reflected from the second-step pits is small. This makes it possible to pick up the second information. Therefore, it becomes possible to increase the information recording density of an optical disc. Further, different kinds of information can be read out separately from a single disc.

What is claimed is:

1. An optical disc comprising:
   a first set of pits arranged in a track direction and having a first depth; and
   a second set of pits arranged adjacent to and within said first set of pits and in the track direction, said second set of pits having a second depth.

2. The optical disc according to claim 1, wherein the first and second sets of pits each store information independent of one another.

3. The optical disc according to claim 2, wherein each of said first and second sets of pits reproduces information stored therein when irradiated with light of a first and a second wavelength, respectively.

4. The optical disc according to claim 3, wherein the first wavelength is two times the second wavelength.

5. The optical disc according to claim 1, wherein the first depth is two times the second depth.

6. The optical disc according to claim 1, wherein said first set of pits comprises at least first and second pits, each having a depth equal to said first depth, and said second set of pits comprises at least a third pit having a depth equal to said second depth, said third pit being arranged between said first and second pits.

7. The optical disc according to claim 6, wherein said third pit abuts each of said first and second pits.

8. A pickup apparatus for reading out information recorded on a recording surface of an optical disc having a first set of pits arranged in a track direction at a first depth and having a second set of pits arranged adjacent to and within the first set of pits and in the track direction at a second depth which is a half of the first depth, said pickup apparatus comprising:

means for emitting a first coherent light beam having a first wavelength which is four times the depth of the first set of pits;

means for emitting a second coherent light beam having a second wavelength which is four times the depth of the second set of pits;

means for directing the first and second coherent light beams onto the first and second sets of pits of the recording surface of the optical disc, respectively, and for directing at least respective parts of the first and second light beams reflected by the recording surface to a detecting means; and said detecting means detecting quantities of the at least respective parts of the reflected first and second light beams.

9. The apparatus according to claim 8, further comprising means for selecting one of the first and second coherent light beam emitting means as a light source for emitting a light beam to be introduced onto the recording surface.

10. The apparatus according to claim 8, further comprising means for separating the at least respective parts of the reflected first and second light beams, wherein the detecting means detects the at least respective parts of the first and second light beams individually and simultaneously.

* * * * *